United States Patent Office 3,146,920
Patented Sept. 1, 1964

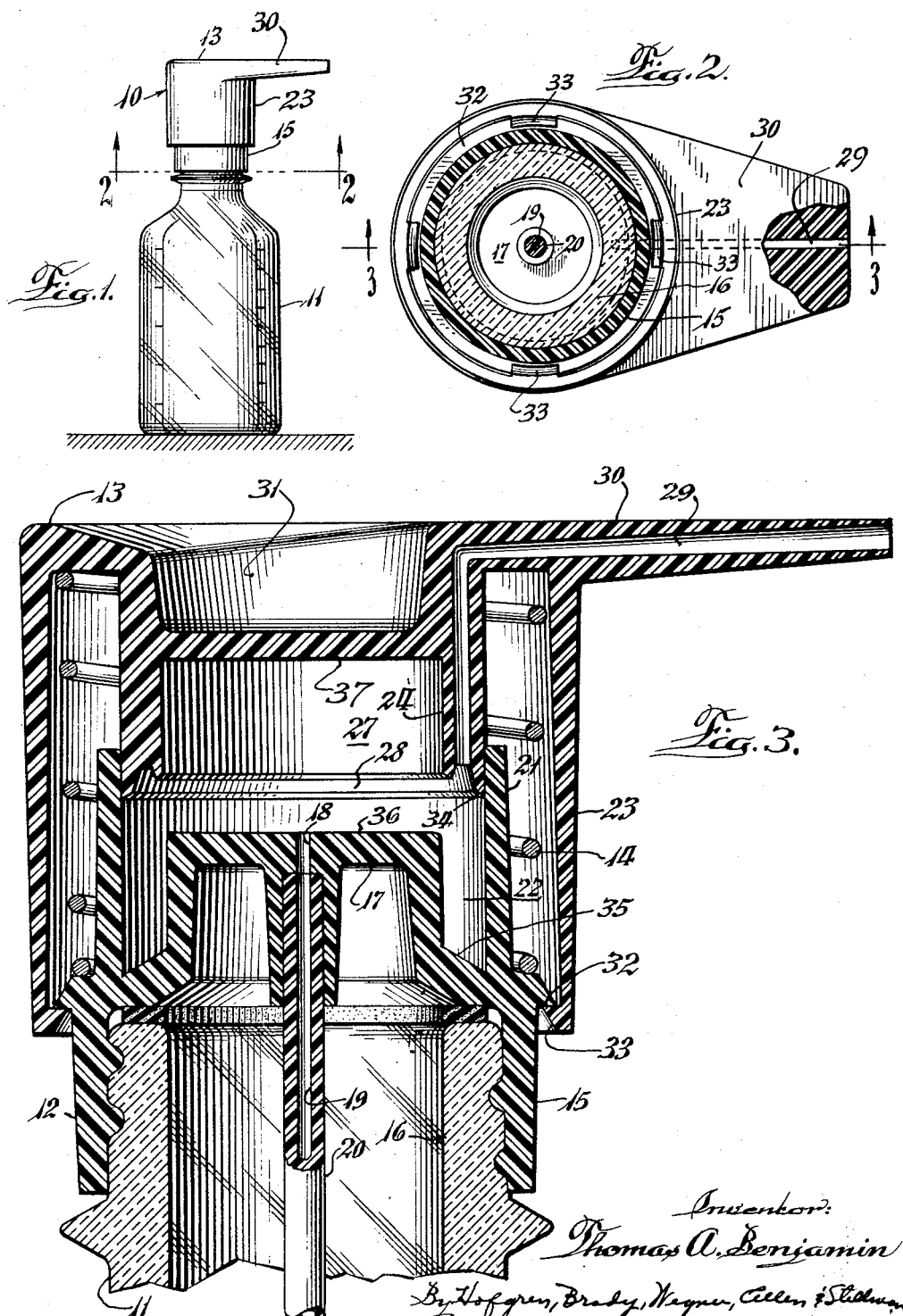

3,146,920
DISPENSER FOR METERED AMOUNTS OF FLUID
Thomas A. Benjamin, Newburgh, Ind., assignor to Mead
Johnson & Company, a corporation of Indiana
Filed Mar. 8, 1962, Ser. No. 178,491
3 Claims. (Cl. 222—321)

This invention relates to a dispensing device and more particularlly to a metering pump for dispensing liquids from a supply, as a bottle.

When it is desired that a measured amount of liquid, such as vitamins, be obtained from liquid source, such as a bottle, it is generally necessary that the liquid be poured into a separate vessel for measurement. Usually this requires pouring the liquid into a measuring cup or into a spoon, a time-consuming and burdensome task. Another method of dispensing liquids from a bottle is by means of a dropper, a relatively inaccurate form of liquid dispensation. The only other means currently found for obtaining a measured amount of liquid from a vessel is a small pump which possesses valve components. Such devices are rather expensive to produce and not always reliable in operation.

It is a primary object of this invention to provide a new and improved metering pump.

It is also an object of this invention to provide a new and improved metering pump wherein all valving is eliminated and an accurately measured amount of liquid may be dispensed.

It is another object of this invention to provide a new and improved metered pump consisting of a plurality of pistons slidably mounted in a plurality of cylinders and designed to dispense a measured amount of liquid without the use of valve components.

It is still another object of this invention to provide a new and improvement metered pump consisting of a pair of coaxial pistons slidably mounted in a pair of coaxial cylinders and designed to dispense only a measured amount of liquid when actuated.

It is yet another object of this invention to provide a new and improved metered pump consisting of a pair of coaxial pistons slidably mounted in a pair of coaxial cylinders wherein the first cylinder adapted to receive an unmeasured amount of liquid from a liquid source and the second cylinder is adapted to receive only a measured amount of liquid from the first cylinder, whereby a finite quantity of liquid may be expelled from a second cylinder to the exterior upon the actuation of the pump without the use of any valve components.

Other objects, features and advantages of the present invention will be apparent from the following description of the preferred embodiment illustrated in the accompanying drawings, in which:

FIGURE 1 is a side elevational view of an embodiment of this invention mounted for use on a bottle;

FIGURE 2 is a section view taken along the line 2—2 of FIGURE 1; and

FIGURE 3 is a section view taken along the line 3—3 of FIGURE 2.

In FIGURE 1 the pump of this invention, indicated 10, is shown mounted for use on a liquid source or bottle 11. The pump 10 consists of two main members, inner member 12 and outer member 13. The pump 10 may also include a biasing means, such as a spring 14, which tends to urge the members 12 and 13 apart.

The inner member 12 is formed of relatively rigid material and has a threaded annular base, or securing means, 15 for securing the member 12 to the threaded neck 16 of a bottle 11. An upstanding boss or piston means 17 is formed centrally of the member 12 and has a passageway 18 that communicates with the passageway 19 of the hollow tube 20 which is secured to and extends downwardly from the boss 17 for establishing communication with the liquid source. An upstanding wall or ring 21 surrounds and is spaced from the boss 17, forming an annular cavity or cylinder 22 which is designed to receive only a measured amount of liquid.

The outer member 13 includes a pair of circular concentric walls, such as outer wall 23 and inner ring or piston means 24. Piston 24 is designed to slide vertically between boss 17 and wall 21 in sealing relation in cylinder 22. Cooperating lugs 32 and flanges 33 are provided for limiting the longitudinal movement of the outer member 13 with respect to the inner member 12 in opposition to the biasing action of the spring. The annular piston 24 encloses a circular cavity or cylinder 27 which is designed to receive an unmeasured quantity of liquid from the liquid source by means of passageways 18 and 19. A channel 28 is formed on the bottom of piston 24 and communicates with an outlet means or passage 29 formed in the piston 24 and passes through the integrally formed spout 30 to establish communication with the exterior by means of which liquid is discharged. A depressed area 31 provides a surface on the top of the outer member 13 for receiving external manual actuation to be imparted to the device.

To initiate the dispensing of liquid by means of this device an initial priming action must be undertaken. To begin the priming action top member 13 is urged longitudinally downward relative to bottom member 12, until the top member has reached its downward limit of travel with the bottom 34 of the piston 24 in contact with the bottom 35 of cylinder 22 and the top 36 of piston 17 in facial engagement with the top 37 of the cylinder 27. This action causes almost total dispacement of all the air which had occupied the various spaces between the two members 12 and 13. The manual depressing force is then removed from outer member 13 and spring 14 causes that member to move longitudinally upward relative to the bottom member 12.

At the initial stage of its upward travel, and before the bottom 34 of piston 24 has passed the top of piston 17, a low pressure area exists in the cylinder 27. The atmospheric pressure in the bottle 11 urges the liquid therein to travel upwards through the tube 20 and, by means of passageways 19 and 18, to rise into the cylinder 27. At the same time air from the exterior is filling the cylinder 22 by being drawn in through outlet means 29. The amount of liquid drawn into cylinder 27 is not any given measurement but is more than enough to fill the cylinder 22.

As the top member continues its longitudinal rise, the bottom 34 of piston 24 passes the top of piston 17, thereby breaking the seal between cylinders 22 and 27 and establishing communication therebetween. The liquid in cylinder 27 then spills into cylinder 22, which will receive only an amount which can be contained therein up to the top of the side wall formed by the piston 17. Any excess will then return to the liquid source through passages 18 and 19. At the same time, the air which has been drawn into cylinder 22 is displaced by the liquid and passes into cylinder 27. This completes the priming action of the pump which now has a given quantity of fluid contained in the cylinder 22 and is ready to discharge that fluid to the exterior in response to the appropriate actuation. The amount of fluid contained in cylinder 22 may be varied by merely designing the cylinder with a greater or smaller volume and correspondingly adjusting the size of the piston 24.

To dispense the measured quantity of fluid the top member is again depressed and undergoes the same physical movement as it did in the priming action. However, cylinder 22 now contains a measured quantity of liquid, rather than a volume of air. Thus the longitudinal downward movement of piston 24 into cylinder 22 will cause that liquid to be forced out of the cylinder by means of channel 28 and discharge passage 29, completely evacuating cylinder 22 of the liquid contained therein, save for a measured amount corresponding to the volume of channel 28. It is to be noted that this discharge action is also the initial stage of the priming action and when the actuation force is removed after discharging the liquid, the pump completes its priming action as previously described.

Inner member 12 is provided with a circumferential lip 32 and outer member 13 has a cooperating inwardly extending flange 33 to establish limiting means. These cooperating members serve to limit the relative travel of the members 12 and 13 in response to the spring 14.

The device of this invention eliminates the need for a separate vessel to measure liquid dispensed from a liquid source such as a bottle, for this device dispenses only a measured amount of liquid. Moreover, it accomplishes the advantage of dispensing only a measured amount of liquid from a liquid source without the use of any valve component. This device consists of only two main components which are molded parts slidable relative to each other. Thus, it is extremely reliable under the strain of repeated operation and is relatively economical to produce and assemble. Finally, the dispensing operation is a simple process, requiring only a vertical movement to be imparted to the device, such as by manual thumb pressure. This actuation dispenses a measured amount of fluid and initiates the priming action which is completed when the actuation force is removed and the two components return to their initial position, as previously explained.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A dispenser for dispensing a measured amount of fluid from a fluid source, comprising: a device, means for supplying fluid to said device including a first piston slidably mounted in a first cylinder, said first piston having means establishing communication between said first cylinder and a fluid source, said latter means including a hollow tube; means for ejecting the measured amount of fluid from said device including an annular piston having an outlet passage therein and extending through said annular piston, said annular piston slidably mounted in an annular cylinder, said ejecting means being mounted coaxially with said supplying means, said first cylinder and said annular cylinder sequentially being in free fluid communication for feeding an unmeasured amount of fluid to said first cylinder, said annular cylinder adapted to receive only a measured amount of fluid from said first cylinder, whereby a finite quantity of fluid may be expelled from said annular cylinder to the exterior through said annular piston upon actuation thereof.

2. A dispenser for dispensing a measured amount of liquid from a liquid source, comprising: a first member adapted to be secured to a liquid source, said first member including a piston and an annular cylinder adapted to receive a measured amount of liquid; a second member slidably mounted on said first member, said second member including a cylinder for association with said first piston and an annular piston for association with said annular cylinder; liquid inlet means in said first member establishing communication between said second cylinder and a liquid source; liquid outlet means in said annular piston extending therethrough to establish communication between said annular cylinder and the exterior, said first and second cylinders adapted to be in intermittent free communication with each other for feeding an unmetered quantity of fluid from said first cylinder to said second cylinder, said second cylinder adapted to receive only a measured amount of fluid from said first cylinder, whereby substantially all of said measured amount of fluid in said second cylinder in expelled therefrom through said annular piston upon actuation thereof.

3. A dispenser for dispensing a measured amount of liquid from a liquid source, comprising: a first member adapted to be secured to a liquid source, said first member including an upstanding boss formed centrally thereof and an upstanding ring surrounding said boss and spaced therefrom, said boss and said ring being joined at their base to form a channel of finite volume therebetween, said first member further including liquid passage means formed in said boss and communicating with said liquid source; a second member slidably engaging said first member, said second member including a depending ring adapted to slidingly engage said channel, said second member also including a cavity adapted to be slidingly engaged by said boss; liquid inlet means in said boss establishing communication between said second cylinder and a liquid source; liquid outlet means in said annular piston establishing communication between said annular cylinder and the exterior, said first and second cylinders adapted to be in intermittent free communication with each other for feeding an unmetered quantity of fluid from said first cylinder to said second cylinder, said second cylinder adapted to receive only a measured amount of fluid from said cylinder, whereby a finite quantity of fluid may be expelled from said second cylinder to the exterior by said second piston upon actuation thereof.

References Cited in the file of this patent

UNITED STATES PATENTS

| | | |
|---|---|---|
| 2,214,714 | Bates | Sept. 10, 1940 |
| 2,880,914 | Lerner et al. | Apr. 7, 1959 |